(12) United States Patent
Akiyama

(10) Patent No.: US 7,047,357 B1
(45) Date of Patent: May 16, 2006

(54) VIRTUALIZED STRIPING CONTROLLER

(75) Inventor: James Akiyama, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/164,898

(22) Filed: Oct. 1, 1998

(51) Int. Cl.
G06F 12/00 (2006.01)
G06F 13/00 (2006.01)

(52) U.S. Cl. .................. 711/114; 711/157; 711/168

(58) Field of Classification Search ........... 711/114, 711/150, 157, 168; 710/10
See application file for complete search history.

(56) References Cited

U.S. PATENT DOCUMENTS

| | | | | |
|---|---|---|---|---|
| 4,047,157 A | * | 9/1977 | Jenkins | 364/900 |
| 5,333,305 A | * | 7/1994 | Neufeld | 395/575 |
| 5,608,891 A | * | 3/1997 | Mizuno et al. | 395/441 |
| 5,619,723 A | * | 4/1997 | Jones et al. | 710/3 |
| 5,671,439 A | * | 9/1997 | Klein et al. | 710/1 |
| 5,694,581 A | * | 12/1997 | Cheng | 710/7 |
| 5,724,539 A | * | 3/1998 | Riggle et al. | 711/100 |
| 5,790,811 A | * | 8/1998 | Hewitt | 710/105 |
| 5,905,910 A | * | 5/1999 | Anderson | 395/841 |
| 5,913,057 A | * | 6/1999 | Labatte et al. | 713/2 |
| 6,161,165 A | * | 12/2000 | Solomon et al. | 711/114 |
| 6,223,301 B1 | * | 4/2001 | Santeler et al. | 714/6 |
| 6,237,052 B1 | * | 5/2001 | Stolowitz | 710/61 |
| 6,253,271 B1 | * | 6/2001 | Ram et al. | 710/128 |
| 6,341,342 B1 | * | 1/2002 | Thompson et al. | 711/166 |
| 6,397,314 B1 | * | 5/2002 | Estakhri et al. | 711/168 |
| 6,405,049 B1 | * | 6/2002 | Herrod et al. | 455/517 |
| 6,567,864 B1 | * | 5/2003 | Klein | 710/10 |

* cited by examiner

Primary Examiner—Pierre M. Vital
(74) Attorney, Agent, or Firm—Blakely, Sokoloff, Taylor & Zafman LLP

(57) ABSTRACT

A striping disk controller and disk drive system for a computer system wherein the computer system includes a CPU connected to a system bus and executes an operating system including a BIOS, the striping disk controller and disk drive system includes, 1) an interface connected to the system bus and communicating with the BIOS, 2) first and second disk drives each having data separator electronics, data formatting electronics and head positioning electronics, and 3) a striping controller connected between the first and second disk drives and the interface, the striping controller adapted to cause data being communicated between the system bus and the first and second drives to be written to and read from the first and second drives in an interleaved form and substantially in parallel.

15 Claims, 9 Drawing Sheets

EXAMPLE ONE

THE O/S MAKES A REQUEST FOR 8 SECTORS OF DATA. STARTING WITH SECTOR 33. THE SECTORS REQUESTED (AND THEIR BITS SET) ARE:

|    | SECTOR ADDRESS |
|----|----------------|
| 33 | 100001         |
| 34 | 100010         |
| 35 | 100011         |
| 36 | 100100         |
| 37 | 100101         |
| 38 | 100110         |
| 39 | 100111         |
| 40 | 101000         |

OUR PROPOSAL SHIFTS THE SECTOR REQUEST RIGHT 1-BIT AND USES THE LSB TO SELECT THE DRIVE

FIG. 9

|  |  | EVEN COUNT ||  ODD COUNT ||
|---|---|---|---|---|---|
|  |  | DRIVE 0 | DRIVE 1 | DRIVE 0 | DRIVE 1 |
| ODD COUNT | START | 0 | 0 | 0 | 0 |
| ODD COUNT | COUNT | 0 | 0 | +1 | 0 |
| EVEN COUNT | START | +1 | 0 | +1 | 0 |
| EVEN COUNT | COUNT | 0 | 0 | 0 | +1 |

VIRTUALIZED STRIPING CONTROLLER

FIELD OF THE INVENTION

The invention is generally directed at a low cost approach to gaining higher performance from disk drives by striping.

DESCRIPTION OF THE PRIOR ART

Parallel transfer drives were the first effort at gaining hard disk performance by making parallel accesses. In a parallel transfer drive, data is written and read simultaneously off of multiple platters in a single housing. But parallel transfer drives, while fast, are very expensive.

The concept of striping was developed to achieve the advantages of parallel transfer drives at a much lower cost by combining two totally separate, low-cost drives with sophisticated software. Striping creates a single virtual disk from two physical drives. The sectors of the two physical disks are interleaved on the virtual drive. The effect is that the virtual disk has double the capacity of a single disk and double the data transfer rate of a single disk drive since the two physical drives can be read and written in parallel.

FIG. 1 is a schematic that illustrates the basic concept of striping. Referring now to FIG. 1, a virtual drive 3 is a model of the striped physical drives 4 and 5. Physical drives 4 and 5 are separate disk drives each having its own set of drive electronics 6 power supplies and mirrors (not shown) and disks which in this example are single disks 7a and 7b. Each disk is divided into tracks and each track is divided into sectors. For purposes of illustration, each disk is shown as having 8 sectors (numbered 0–7). Sectors 0–7 on physical drive 4 correspond to sectors 40–47 on virtual disk 3. And sectors 0–7 on physical drive 5 correspond to sectors 50–57 on virtual disk drive 3. Striping creates a new interface which is indicated at reference numeral 2 in FIG. 1.

Striping was first introduced in SCSI (Small Computer System Interface) drives for work stations. The original motivation for striping was to gain more performance in the work station environment where performance was previously limited to a data transfer rate of 10 megabits per second that was mandated by a drive rotating at 3600 rpm and having 17 sectors of 512 bytes per track.

Later, the basic striping technology developed for SCSI drives was applied to the integrated drive electronics ("IDE") drive. This transition was motivated by the even lower cost and wider adoption of the IDE drive in the Industry Standard Architecture ("ISA") based computer (IBM compatible) market. But these drives still used the architecture developed in the SCSI interface environment to implement the striping IDE drive which relies on a dedicated microprocessor.

These IDE controllers stripe the data by simultaneously reading data from the primary and secondary IDE channels. Software drivers are then used to encode and decode the striped data streams. In this approach, there is a maximum of four physical disk drives and two logical drives per IDE interface. Each logical disk drive is mapped to two physical disk drives through a sophisticated software driver.

An IDE hard disk drive integrates both a hard disk drive and its controller in one unit inside the drive housing. An IDE drive appears to the host computer as two blocks of I/O (input/output) registers, a command register block and a control register block, with addresses in the I/O space of the ISA bus. The IDE drive interfaces to an ISA or PCI (Peripheral Component Interconnect) bus. The interface between an IDE drive and the system bus, sometimes called a host adapter, is typically a small card that plugs into the ISA bus. On the IDE side of the card, a 40 pin ribbon cable leads to the remainder of the IDE electronics. The IDE interface essentially reduces the width of the ISA bus by eliminating the ISA address lines and substituting two commands, CS1FX and CS3FX, which select respectively the command register block or the control register block from an ISA bus address. Parallel data is supplied to the IDE interface where it is converted to serial data, converted to analog and written on the media in specified locations called addresses. IDE electronics detect errors through the addition of error detection algorithms added to each sector. But the IDE electronics typically do not correct errors. Rather, the IDE drive passes raw error data back to the host for correction.

The IDE specification limits the sector per track to 64; the tracks to 2048 per disk, 16 heads per disk and 2 drives per interface. A PC (Personal Computer) type computer system can have two IDE interfaces. That is, two channels are located at two different addresses in I/O space. In a standard computer using an IDE interface, this means that it is possible to hook up a maximum of four physical drives conventionally.

The problem with the prior art approaches is that the standard IDE software drivers cannot be used, and special device drivers must be written for each operating system. In addition, the hardware is expensive since an additional microprocessor is required.

SUMMARY OF THE INVENTION

A striping disk controller and disk drive system for a computer system wherein the computer system includes a CPU connected to a system bus and executes an operating system including a BIOS, the striping disk controller and disk drive system includes, 1) an interface connected to the system bus and communicating with the BIOS, 2) first and second disk drives each having data separator electronics, data formatting electronics and head positioning electronics, and 3) a striping controller connected between the first and second disk drives and the interface, the striping controller adapted to cause data being communicated between the system bus and the first and second drives to be written to and read from the first and second drives in an interleaved form and substantially in parallel.

BRIEF DESCRIPTION OF THE DRAWING

The preferred embodiment will be described in connection with the Drawing in which:

FIG. 9 is a table indicating how virtual sector starting addresses and sector counts are mapped to physical starting address and counts.

DESCRIPTION OF THE PREFERRED EMBODIMENT

The present invention is a striping disk controller used in a computer system that includes a CPU connected to a system bus and running an operating system and having a BIOS (Basic Input/Output System). In the following description, for purposes of explanation, numerous specific details are set forth in order to provide a thorough understanding of the present invention. It will be evident, however, to one of ordinary skill in the art that the present invention may be practiced without these specific details. In other circumstances, well-known structures and devices, and interfaces are shown in block diagram form in order to avoid unnecessarily obscuring the present invention.

Figure 1:
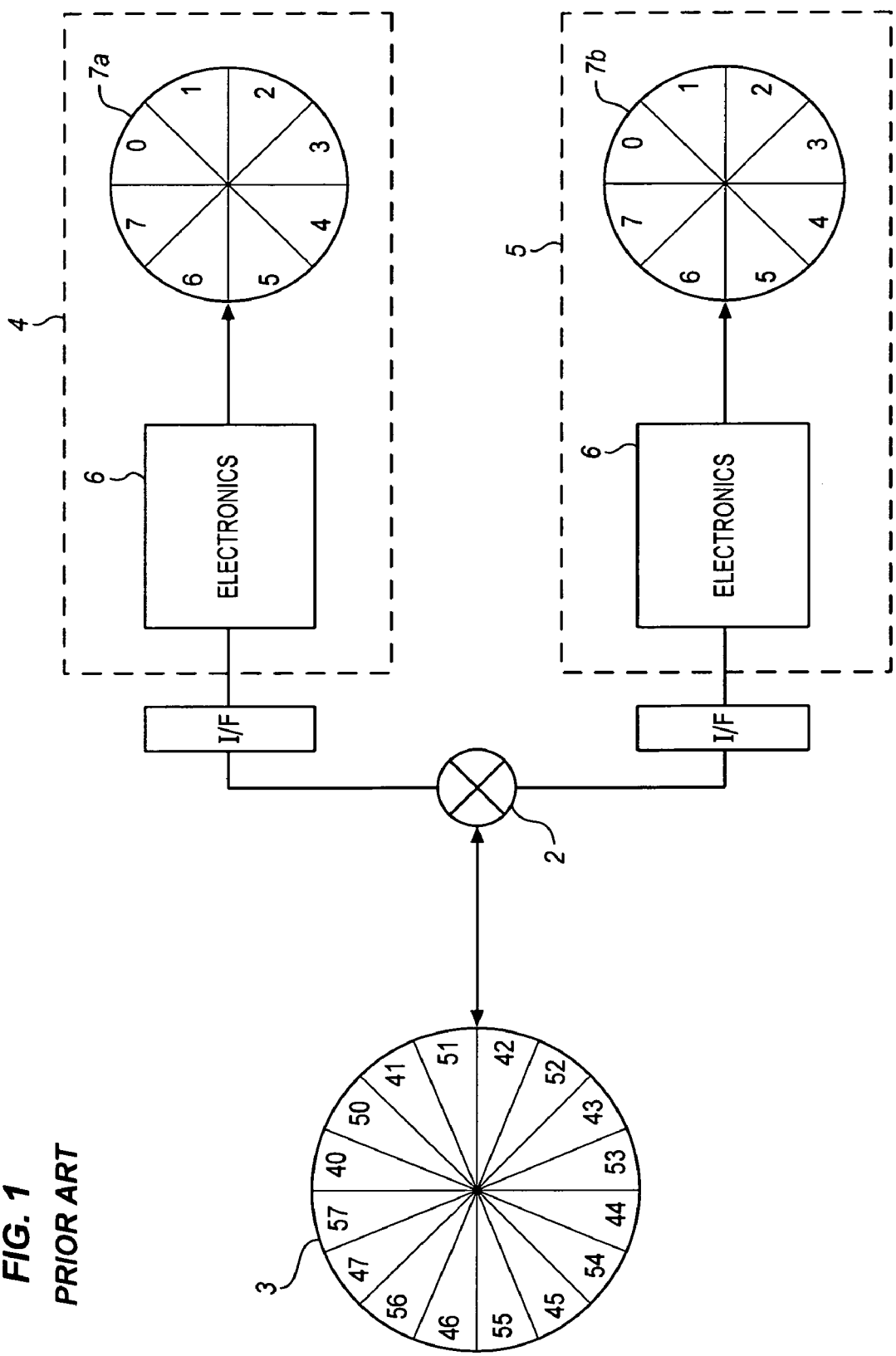
FIG. 1 is a schematic of a virtual disk.
Figure 2:
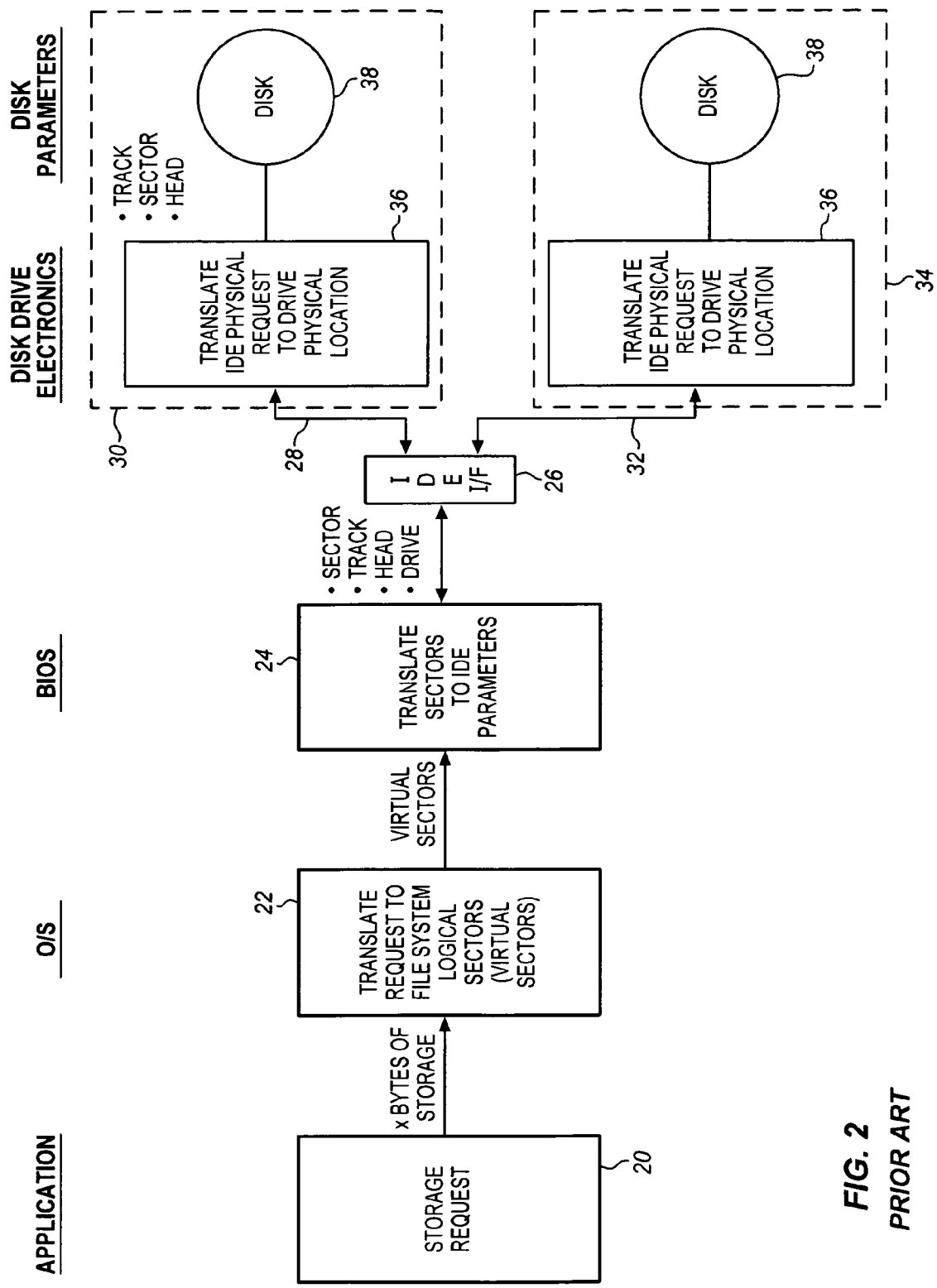
FIG. 2 is a process flow chart showing how disk accesses are made in a conventional IDE system.

FIG. 2 is a process flow chart showing how disk accesses are made in a conventional IDE system. In process block 20 a requirement for X bytes of storage is generated by an application. The application passes this request to the operating system 22. Operating system 22 translates the application request to a file system request. In the case of conventional DOS (Disk Operating System), the file system request includes an identity of "virtual sectors", which are incremented corresponding to the disk track and head. That is, the zero sector of track 2 is one virtual sector higher than the last physical sector on track 1. A Basic Input/Output Operating System (BIOS) is a set of machine language routines, usually found in a ROM (read only memory) on the mother board, that work with I/O interfaces at the lowest level and thereby relieve higher level code of this task. In the case of disk storage, the BIOS translates virtual sector requests received from the operating system into the physical IDE requests at process step 24. Physical IDE request means a request for a specific sector, a specific track, a specific head and a specific drive. The physical request is made in compliance with the IDE specification and supplied to IDE interface 26 which decides the drive request and passes on the sector, track and head requests either over bus 28 to IDE drive 30 or over bus 32 to IDE drive 34. Each IDE drive contains conventional IDE electronics 36 and a disk assembly 38 of one or more disks up to 16 surfaces. IDE electronics 36 performs several functions: It translates a request for access request supplied from the BIOS to specific physical sectors, tracks and heads on disk 38. It also performs data separation which on reads generates a clock and digital data signal in serial format. It also performs formatting functions, namely serial to parallel conversion on reads and parallel to serial on writes. It also performs head positioning and analog data functions.

Figure 3:
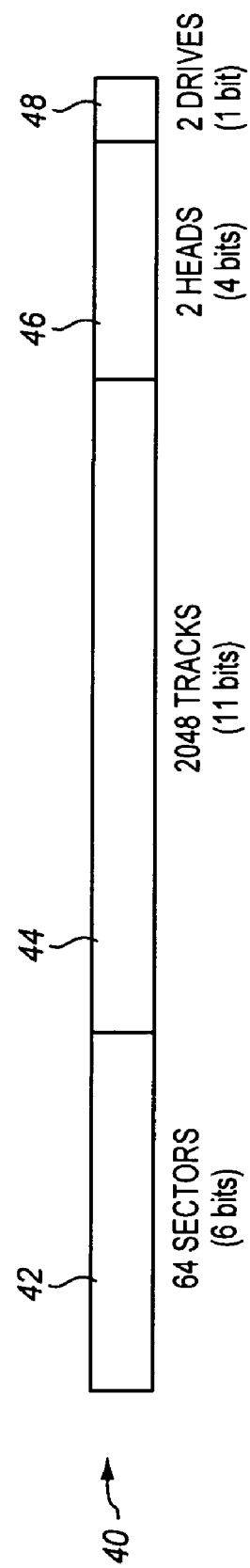
FIG. 3 is a schematic of the data structure of a system request for access to an IDE drive.

FIG. 3 is a schematic of the data structure of a system request for access to an IDE drive that is relevant to the present invention. It is generally that portion which relates to a particular disk and the location on that disk that specific data is to be written or read. Referring now to FIG. 3, a system access request structure 40 consists of a sector request bit string 42 of 6 bits that can uniquely identify 64 sectors; a track request bit string 44 of 11 bits that can uniquely identify 2048 tracks; a head request bit string of 4 bits that can uniquely identify 16 heads and a drive bit 48 that can identify 2 drives. Enhanced IDE (EIDE) will increase the allowable tracks. It will be apparent to those of ordinary skill in the art that equivalent variations of basic IDE may be implemented without departing from the scope of the present invention.

Figure 4:
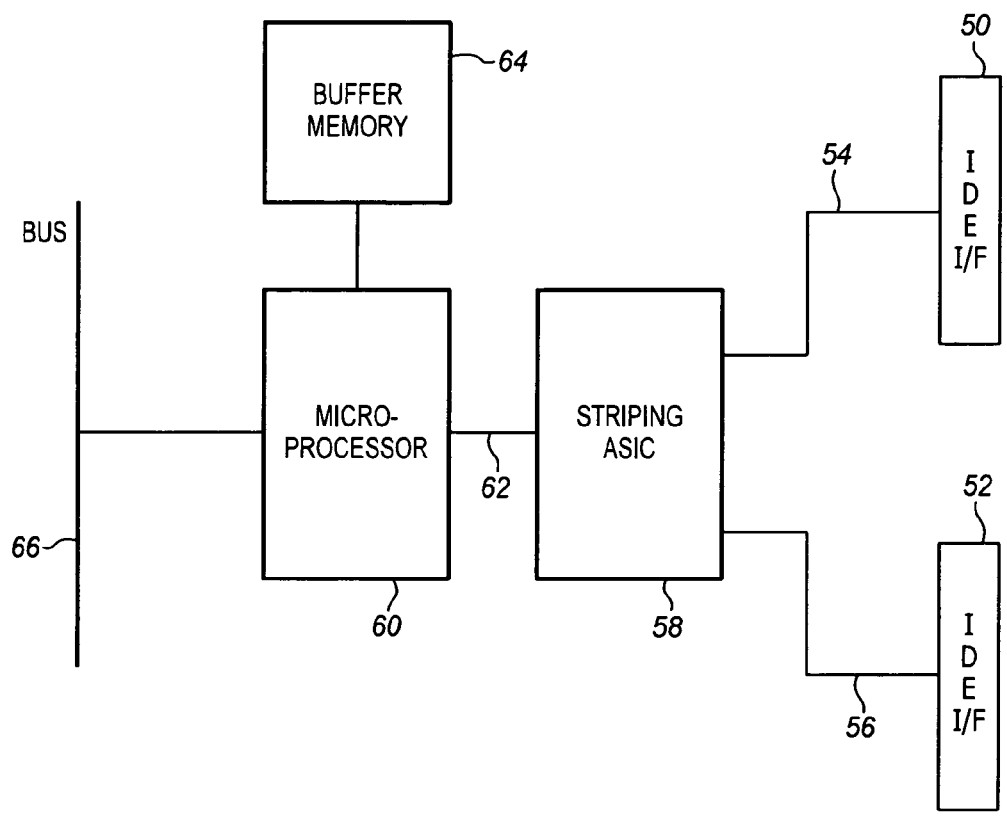
FIG. 4 is a block diagram of a prior art striping system.

FIG. 4 is a block diagram of a prior art striping system. Referring to FIG. 4, the two IDE interfaces 50 and 52 are connected via busses 54 and 56 to striping controller 58. A microprocessor 60 is connected by bus 62 to striping controller 58. Microprocessor 60 runs the code that determines the type of striping action—e.g. interleaving the two disk drives to get better performance or mirroring for better redundancy. Buffer memory 64 stores some of the code for microprocessor 60 and acts as a cache for microprocessor 60. Microprocessor 60 is also interfaced to a host computer system across bus 66 such as ISA or PCI bus. The IDE electronics returns status and error signals to microprocessor 60. Microprocessor 60 performs error correction and returns status and error messages to the host. Thus, part of the function of microprocessor 60 is to manage the status and error signals from two different physical disk drives and report only one status and error to the host. The host believes that there is only one hard disk drive with twice the performance and twice the capacity, while in fact there are two disk drives that are interleaved.

The output from striping controller 58 on busses 54 and 56 are compliant to the IDE specification since they connect to IDE interfaces 50 and 52. Striping logic 58 performs the functions of translating the microprocessor 60 requests into the two physical IDE buses.

In this implementation, the disk drive does not look like an IDE drive to the host. Rather a disk access looks like a host to host communication. From an operating system perspective, this means that the standard IDE software driver cannot be used.

Figure 5:
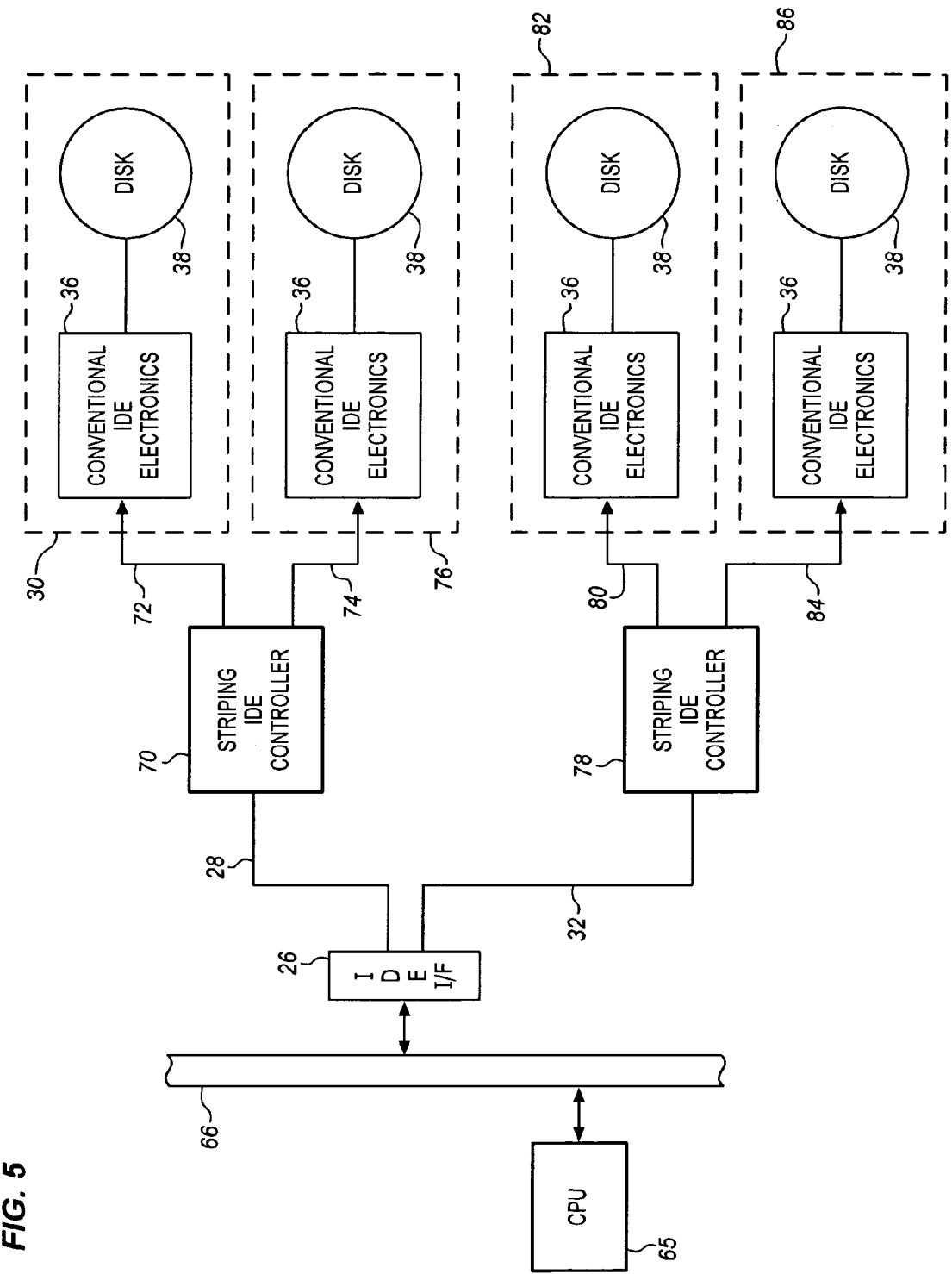
FIG. 5 is a high-level block diagram of the present invention as applied to two virtual disk drives, and four physical drives.

FIG. 5 is a high-level block diagram of the present invention as applied to a single IDE interface. Referring now to FIG. 5, system bus 66 is connected to IDE interface 26. System bus 66 may be an ISA or PCI bus, for example. IDE Bus 28 connects IDE interface 26 to the host computer side of a striping IDE controller 70. The disk drive side of IDE controller 70 is connected by IDE bus 72 to IDE drive 30 and by IDE bus 74 to a second IDE drive 76. A similar configuration consisting of a second striping IDE controller 78 and IDE drives 82 and 84 may but need not be connected to a second IDE bus 32. Each IDE drive, 30, 76, 82 and 86 contain conventional IDE electronics 36 and a disk assembly 38.

When a system access request is received by the striping controller 70, the request is translated into two requests for two physical drives in an interleaving fashion such that even sectors in the system access request are accessed on one physical disk drive, for example drive 30 and odd sector in the system access request are accessed on disk drive 76. This is accomplished by mapping of the bits in the system request into two physical drive requests.

Figure 6:
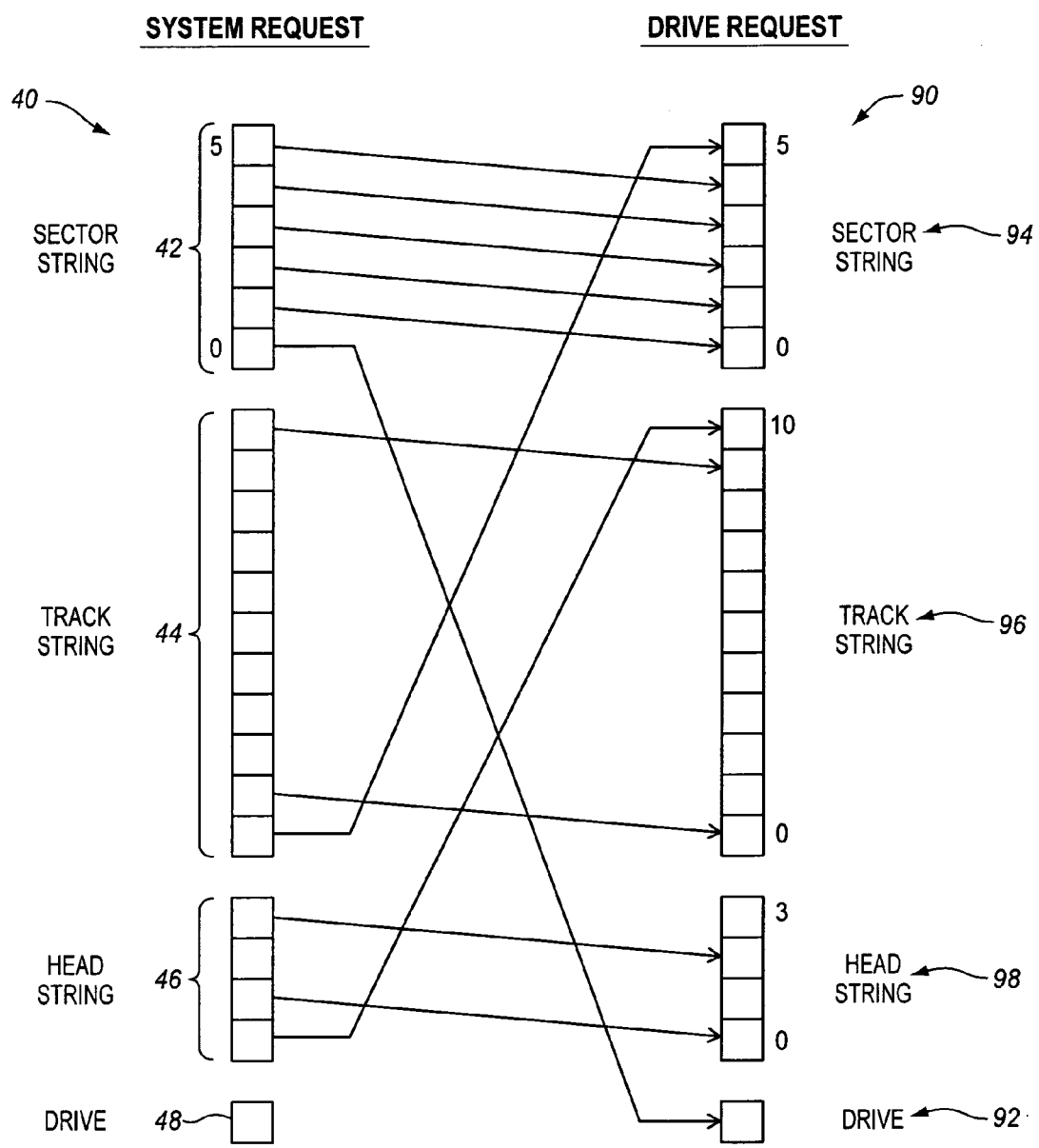
FIG. 6 is a schematic of the system request data structure broken out into its component parts and showing how bits are shifted according to the invention.

Referring now to FIG. 6, the least significant bit, that is the 0 bit in sector string 42 of system request 40 is mapped to the drive select bit 92 of drive request 90. Bit 1 of sector request 42 is mapped to bit 0 of sector request 94 of drive request 90 and so forth. This leaves the most significant bit (msb), that is bit 5 of sector select string 92, open. This position is taken by the least significant bit (lsb), that is bit 0, of track select string 44 of system request 40. Bit 1 of track select string 44 is mapped to bit 0 of track request string 96 of drive request 90 and so forth. This leaves the msb, that is bit 10 of track select string 96, open. This position is taken by the least significant bit, that is bit 0, of head select string 46 of system request 40. Bit 1 of head select string 46 is mapped to bit 0 of head request string 98 of drive request 90 and so forth. This leaves the msb, that is bit 3 in the preferred embodiment of head request string 98 open. This position is not filled in the preferred embodiment.

Because a Personal Computer (PC) system has two IDE interfaces at two different input/output (I/O) addresses and each IDE interface can access two disk drives, there are a maximum of eight physical hard disks that can be mapped to four logical disks with the present invention.

Figure 7:
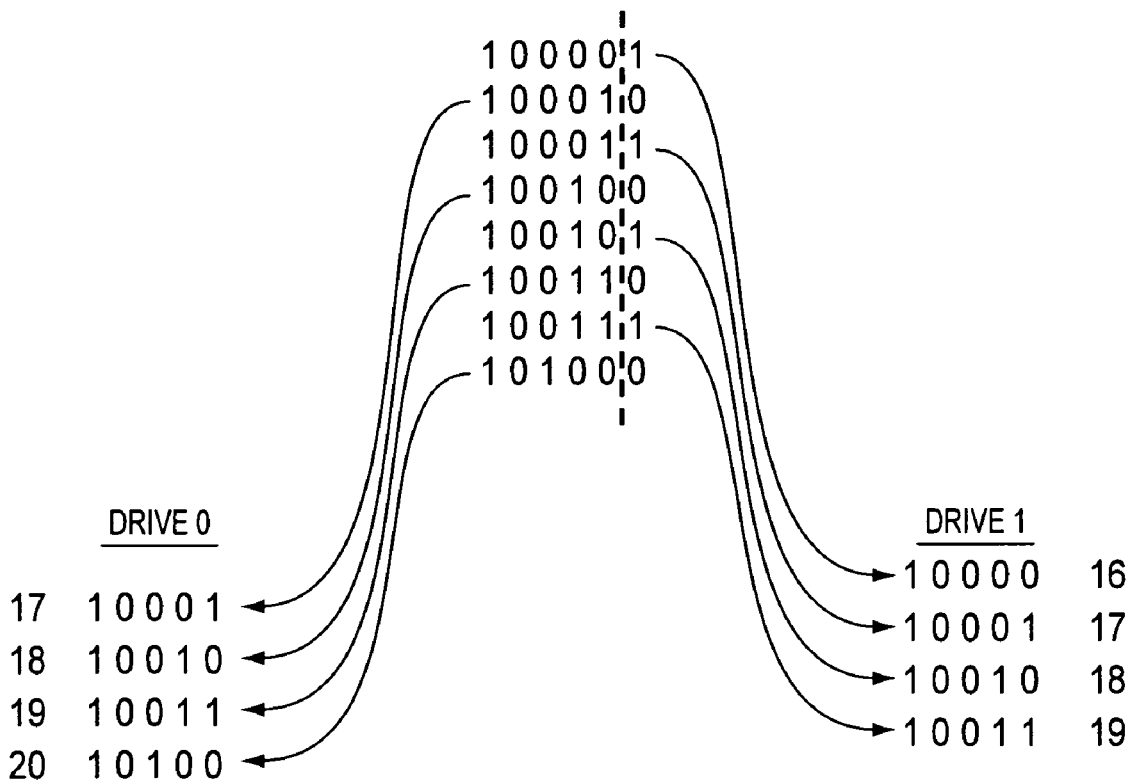
FIG. 7 is an illustration of an example of how the mapping set out in FIG. 6 effects striping.

FIG. 7 illustrates an example of how the mapping set out in FIG. 6 creates striping. Referring now to FIG. 7, the operating system makes a request for 8 sectors starting with sector 33. The binary address of each sector is set out in table 1 of the example shown in FIG. 7. According to the invention, the sector request is shifted right by one bit. This causes the least significant bit to drop out of the address and therefore this bit can be used for something else. In the present invention, this bit is used to select the drive. Thus, in sector 33 where the least significant bit is set to 1, that request would map to drive 1. That is, the 100001 address would drop the last 1 and make a sector request for 100000 which amounts to a request for sector 16 on drive 1. For sector 34, which is binary address 100010, the least significant bit is 0 which is interpreted such that request goes to drive 0. The address is for sector 17 on drive 0. Other addresses are mapped similarly. The next request would be a request for sector 17 from drive 1. The next request would be for sector 18 from drive 0. Then sector 19 from drive 1. etc.

Figure 8:
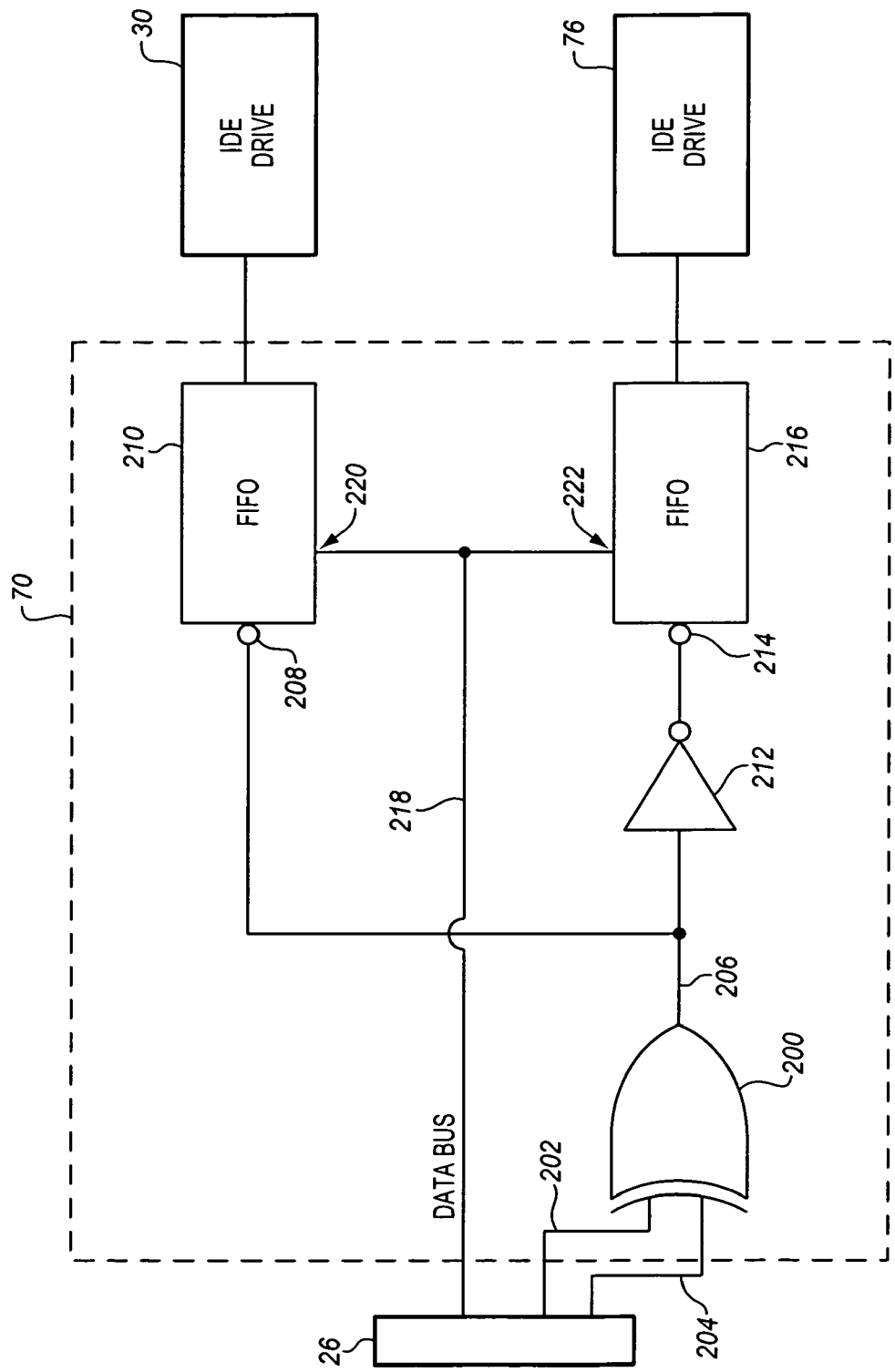
FIG. 8 is a schematic of a preferred embodiment of a striping controller according to the present invention.

FIG. 8 is a schematic of a preferred embodiment of a striping IDE controller according to the present invention. Referring now to FIG. 8, striping IDE controller 70 has exclusive OR ("XOR") gate 200 with inputs 202 and 204, both of which are connected to IDE interface 26. Input 202 is connected through interface 26 to the LSB of the current sector address. Input 204 is the least significant bit from the first sector to be transferred. (In an XOR gate, the output is enabled if either of the inputs is enabled but both inputs are not enabled.) The output 206 of XOR 200 is connected to gating input 208 of first-in-first-out ("FIFO") memory 210. Output 206 of XOR 200 is also connected to the input of inverter 212. The output of inverter 212 is connected to gating input 214 of FIFO memory 216. FIFO memories 210 and 216 may be 32kx8 static random access memories (SRAM). Bus 218 includes 16 data lines which carry 16 bits (two bytes) of data in parallel from IDE interface 26 and supplies it simultaneously to data inputs 220 and 222 of FIFO memories 210 and 216. However, gating inputs 208 and 214 operate such that FIFO 210 and 216 memories only receive data when the gating input is activated. The outputs of FIFO memories 210 and 216 are connected to IDE disk drives 30 and 76 respectively by data busses to the respective IDE drive. FIG. 8 is a physical implementation of FIG. 7. Operationally, FIG. 8 translates alternating sector requests to alternating disk drives.

FIG. 9 illustrates an example of how virtual sector starting addresses and sector counts are mapped to physical starting addresses and counts. Referring to FIG. 9, $S_0$ and $S_1$ refer to starting sector addresses. When the address is even, each physical drive ($Dr_0$ and $Dr_1$) are provided addresses exactly one-half of the virtual (system) address. When an odd starting address is provided, $Dr_0$ is provided an address rounded up and $Dr_1$ is provided an address rounded down.

$C_0$ and $C_1$ refer to sector count. When the count is even, both physical drives ($Dr_0$ and $Dr_1$) are provided counts exactly one-half of the virtual (system) count. When the count is odd, $Dr_0$ is rounded up if the starting address is even; $Dr_0$ is rounded down for odd starting addresses. $Dr_1$ is rounded down when $Dr_0$ is rounded up; $Dr_1$ is rounded up when $Dr_1$ is rounded down.

The design of the present invention as described above according to its preferred embodiment achieves the goals of striping (doubling disk throughput $B_1$ accessing two drives simultaneously) with minimal hardware (most other designs require a microprocessor and or ASIC) and an interface which appears to the operating system as standard IDE interface. Other implementations require custom drivers.

Thus, a low cost, high performance disk drive striping solution is shown. From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from the essence of the invention as defined in the following claims.

What is claimed is:

1. A system comprising:
   a Basic Input/Output System (BIOS) to transmit a system request that includes a sector bit string, a head bit string, a track bit string and a driver bit;
   a system bus coupled to said BIOS;
   an integrated drive electronics (IDE) interface coupled to said system bus that communicates directly with said BIOS via said system bus;
   a striping controller coupled to said IDE interface;
   a first disk drive including first IDE electronics, said striping controller coupled to said first IDE electronics; and
   a second disk drive including second IDE electronics, said striping controller coupled to said second IDE electronics, said first and said second IDE electronics each having data separator electronics, data formatting electronics and head positioning electronics;
   wherein the data written to and read from the first and second disk drives is interleaved by mapping bits of the system request to the first and second disk drives so that even sectors are accessed on the first disk drive and odd sectors are accessed on the second disk drive and a least significant bit of the sector string of the system request is mapped to a drive select bit of the first disk drive.

2. The system of claim 1 wherein said striping controller causes data being transmitted between said interface and said first and second drives to be written to and read from the first and second drives in an interleaved form and substantially in parallel.

3. The system of claim 1 wherein the data being transmitted between the system bus and the first and second disk drives is subdivided into a plurality of sequential blocks.

4. The system of claim 3 wherein the first disk drive is accessed for every other block of data and the second disk drive is accessed for the remaining blocks.

5. A method comprising:
   transmitting an integrated drive electronics (IDE) request from a Basic Input/Output System (BIOS) onto a system bus, the request including a sector bit string, a head bit string, a track bit string and a driver bit;
   receiving said IDE request at an IDE interface connected to said system bus, said IDE interface communicating directly with said BIOS;
   transmitting said IDE request to a striping controller coupled to said IDE interface and first IDE electronics of a first disk drive and second IDE electronics of a second disk drive; and writing to and reading from the first disk drive and the second disk drive in an interleaved form by mapping of bits of IDE request to the first and second disk drives, so that even sectors on the first drive are accessed and odd sectors on the second drive are accessed, wherein a least significant bit of the sector string of the IDE request is mapped to a drive select bit of the first disk drive.

6. The method of claim 5 further comprising receiving the IDE request at the striping controller.

7. The method of claim 5 further comprising writing to and reading from the first disk drive and the second disk drive substantially in parallel.

8. A striping disk controller comprising:

an integrated drive electronics (IDE) interface coupled to a system bus that communicates directly with a Basic Input/Output System (BIOS) separately coupled to said system bus; and control logic coupled to the IDE interface and first disk electronics of a first disk drive and second disk electronics of a second disk drive, the control logic to cause data being transmitted via the system bus to be written to and read from a first disk drive and a second disk drive in an interleaved form by mapping bits of a system request to the first and second disk drives so that even sectors are accessed on the first disk drive and odd sectors are accessed on the second disk drive, the system request including a sector bit string, a head bit string, a track bit string and a driver bit, wherein a least significant bit of the sector string of the system request is mapped to a drive select bit of the first disk drive.

9. The system of claim 8 wherein the data is written to and read from the first and second disk drives substantially in parallel.

10. The system of claim 8 wherein the control logic subdivides the data being transmitted via the system bus into a plurality of sequential blocks.

11. The controller of claim 10 wherein control logic further accesses the first disk drive for every other block of data and accesses the second disk drive for the remaining blocks.

12. The system of claim 8 wherein the control logic receives a system request intended for a single physical drive from the system bus.

13. A system comprising:

a central processing unit (CPU) that executes an operating system including a Basic Input/Output Operating System (BIOS) to transmit a system request that includes a sector bit string, a head bit string, a track bit string and a driver bit;

a system bus coupled to the CPU;

an IDE interface coupled to the system bus that communicates directly with the BIOS via the system bus;

a striping controller coupled to the IDE interface;

a first storage device, including first IDE electronics, said striping controller coupled to said first IDE electronics; and a second storage device, including second IDE electronics, said striping controller coupled to said second IDE electronics;

the striping controller, based on a standard IDE driver instruction, causes data being received to be written to and read from the first and second storage devices in an interleaved form by mapping bits of a system request to the first and second disk drives so that even sectors are accessed on the first disk drive and odd sectors are accessed on the second disk drive wherein a least significant bit of the sector string of the system request is mapped to a drive select bit of the first disk drive.

14. The system of claim 13 wherein the data is written to and read from the first and second storage substantially in parallel.

15. The system of claim 13, wherein the striping controller comprises:

an exclusive-or (XOR) gate coupled to the IDE interface;

a first FIFO memory coupled to the XOR gate and driven by a signal from the XOR gate to access the first storage device; an a second FIFO memory coupled to the XOR gate and driven by the signal from the XOR gate to access the second storage device.

* * * * *